United States Patent
Rottgardt et al.

(10) Patent No.: US 12,320,458 B2
(45) Date of Patent: Jun. 3, 2025

(54) NIPPLE WITH RELIEF VALVE

(71) Applicant: CEJN AB, Skövde (SE)

(72) Inventors: Frank Rottgardt, Skövde (SE); Jörgen Ekström, Skövde (SE); Anna-Lena Olsson, Skövde (SE)

(73) Assignee: CEJN AB, Skövde (SE)

( * ) Notice: Subject to any disclaimer, the term of this patent is extended or adjusted under 35 U.S.C. 154(b) by 116 days.

(21) Appl. No.: 18/260,389

(22) PCT Filed: Sep. 3, 2021

(86) PCT No.: PCT/EP2021/074408
§ 371 (c)(1),
(2) Date: Jul. 5, 2023

(87) PCT Pub. No.: WO2022/148559
PCT Pub. Date: Jul. 14, 2022

(65) Prior Publication Data
US 2024/0052960 A1  Feb. 15, 2024

(30) Foreign Application Priority Data
Jan. 6, 2021 (GB) .................... 2100114

(51) Int. Cl.
*F16L 37/34* (2006.01)
*F16L 37/23* (2006.01)
*F16L 37/56* (2006.01)

(52) U.S. Cl.
CPC .............. *F16L 37/34* (2013.01); *F16L 37/23* (2013.01); *F16L 37/565* (2013.01)

(58) Field of Classification Search
CPC ......... F16L 37/34; F16L 37/35; F16L 37/565; F16L 37/23
See application file for complete search history.

(56) References Cited

U.S. PATENT DOCUMENTS

| | | | | |
|---|---|---|---|---|
| 4,896,697 | A * | 1/1990 | Stromdahl | F16L 37/34 137/614 |
| 5,014,743 | A * | 5/1991 | Makishima | F16L 37/34 137/614.05 |
| 5,884,897 | A * | 3/1999 | Arosio | F16L 37/34 251/149.6 |
| 6,026,857 | A * | 2/2000 | Stucchi | F16L 37/34 137/614 |

(Continued)

OTHER PUBLICATIONS

Search Report for International Application No. PCT/EP2021/074408, 2 pages.

*Primary Examiner* — David Colon-Morales
(74) *Attorney, Agent, or Firm* — Slayden Grubert Beard PLLC

(57) ABSTRACT

A nipple that includes: a fluid passage; a housing; a valve for the fluid passage; and a relief valve for the valve. The relief valve may include: a first sleeve axially movable for sealing against a first seal of the housing; a second sleeve for sealing against a second seal of the housing; and a third seal for sealing between the first sleeve and the second sleeve. Relative axial movement between the first sleeve and the second sleeve opens or closes, respectively by the direction of the axial movement. The relief valve, the first seal, and the third seal are arranged at a set radial distance from a central axis of the fluid passage.

16 Claims, 9 Drawing Sheets

(56) References Cited

U.S. PATENT DOCUMENTS

| | | | | |
|---|---|---|---|---|
| 6,095,190 | A * | 8/2000 | Wilcox | F16L 37/23 |
| | | | | 251/149.6 |
| 6,145,539 | A * | 11/2000 | Wilcox | F16L 37/34 |
| | | | | 251/149.6 |
| 6,382,251 | B1 * | 5/2002 | Hopson | F16L 37/23 |
| | | | | 137/614.04 |
| 7,147,003 | B2 * | 12/2006 | Maldavs | F16L 37/35 |
| | | | | 137/614.04 |
| 8,387,949 | B2 * | 3/2013 | Ekstrom | F16L 37/34 |
| | | | | 251/149.6 |
| 8,707,993 | B2 * | 4/2014 | Cardi | F16L 37/56 |
| | | | | 137/614.04 |
| 8,973,896 | B2 * | 3/2015 | Tiberghien | F16L 37/23 |
| | | | | 137/614.04 |
| 9,395,026 | B2 * | 7/2016 | Brand | F16L 37/34 |
| 9,512,948 | B2 * | 12/2016 | Nowack | F16L 37/32 |
| 10,094,502 | B2 * | 10/2018 | Tiberghien | F16L 37/34 |
| 10,161,552 | B2 * | 12/2018 | Tiberghien | F16L 37/34 |
| 2017/0350548 | A1 | 12/2017 | Tiberghien | F16L 37/34 |
| 2018/0128391 | A1 * | 5/2018 | Ekström | F16L 37/565 |

\* cited by examiner

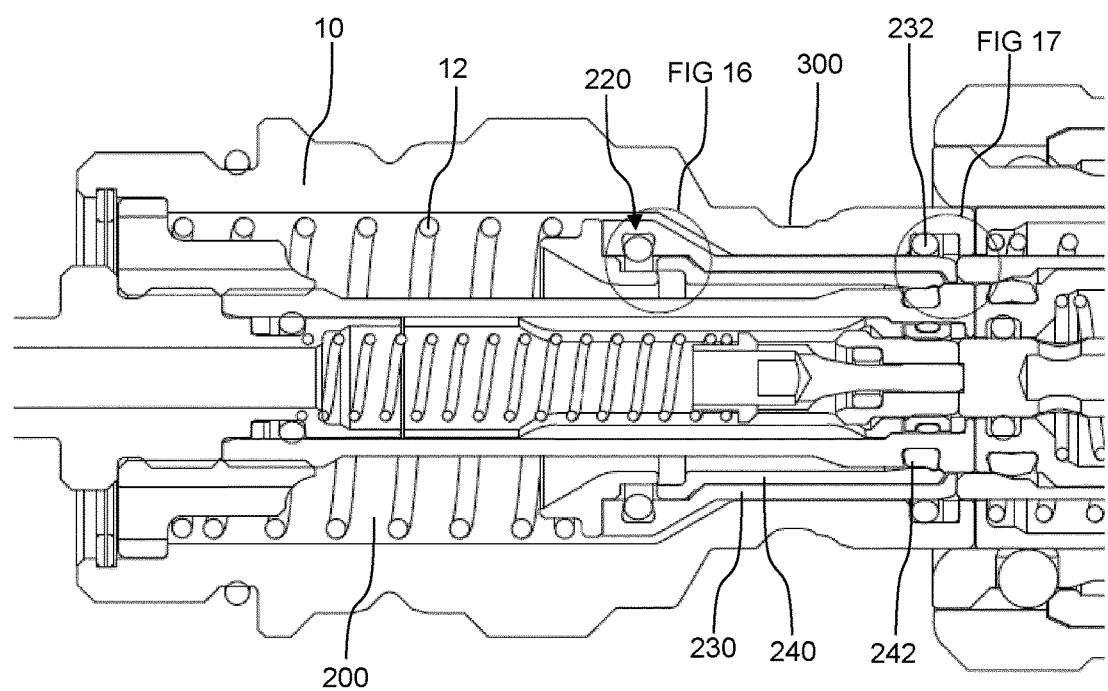
FIG 15
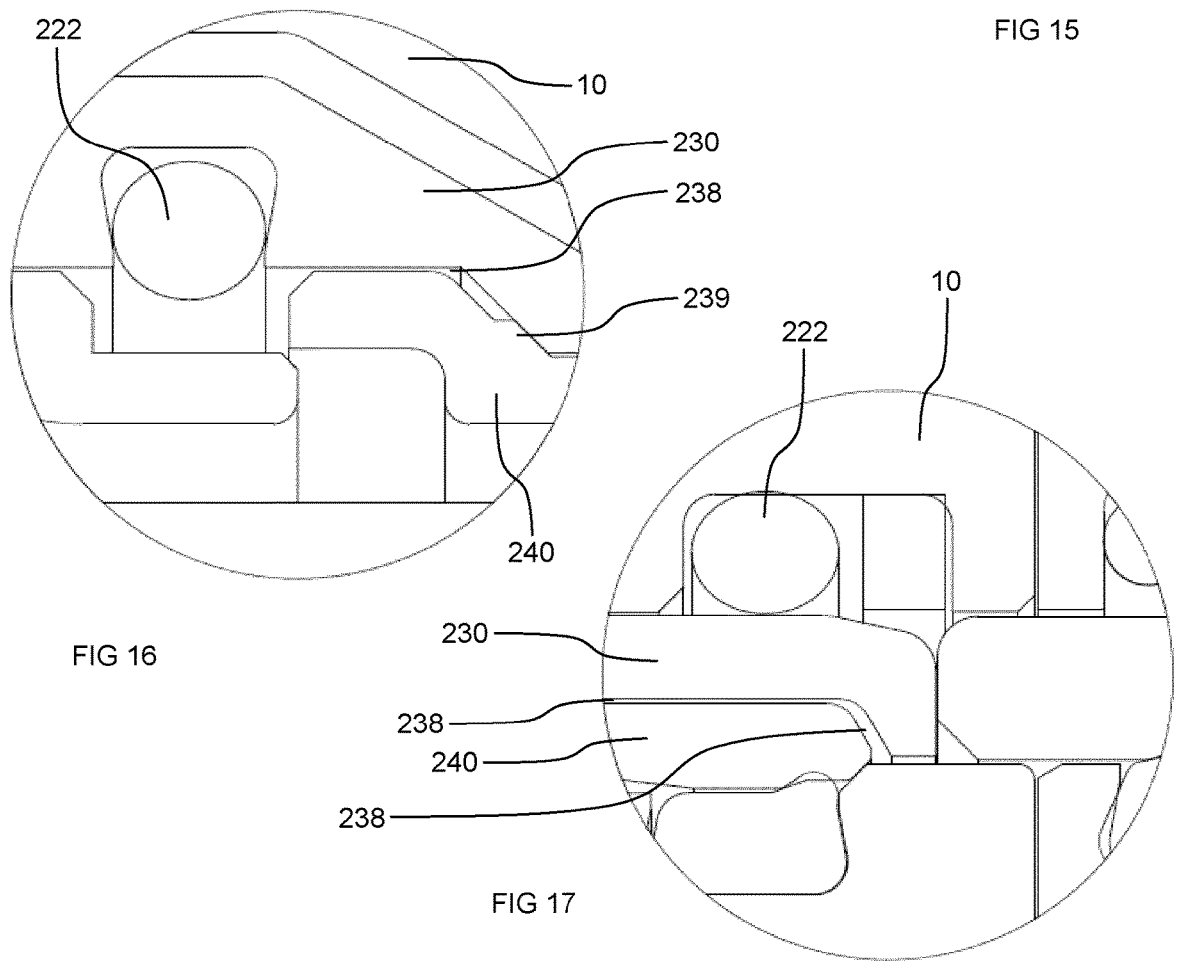
FIG 16
FIG 17

NIPPLE WITH RELIEF VALVE

CROSS-REFERENCE TO RELATED APPLICATIONS

This application is a U.S. National Stage Application of International Application No. PCT/EP2021/074408 filed Sep. 3, 2021, which designates the United States of America, and claims priority to GB Application No. 2100114.4 filed Jan. 6, 2021, the contents of which are hereby incorporated by reference in their entirety.

TECHNICAL FIELD

The present disclosure relates to quick connect couplings. Various embodiments of the teachings of the present disclosure include nipples for a coupling and/or methods for balancing a relief valve, as well as hydraulic tools with such a nipple.

BACKGROUND

Connectors, for example hydraulic connectors, often have a coupling and a nipple. The nipple may be referred to as the male part and the coupling may be referred to as the female part. Such connectors, couplings, are used for connecting fluids, for example hydraulic fluids. Such a connection may be between a pump supplying pressurised fluid on one side and a hydraulic tool on the other side. For some application the connection must lead the fluid in two tube, for example one tube leading the fluid forward and the other tube leading the fluid back, or two tubes supplying fluid back and forth to either side of a piston of the hydraulic tool.

When a nipple and a coupling is disconnected residual pressurised fluid may remain in the nipple, and possibly in the system such as a tube and a pump or tool connected to the nipple. This because, for example, if the nipple is part of a closed system, such as a coupling, a tube, and a nipple, heat, such as sun light, may heat up the closed system and this raises the internal pressure. If the residual internal pressure is too high, then the nipple and coupling cannot be connected by hand force. This because the coupling pressed by only hand force onto the nipple cannot open the valves of the nipple and this is a problem that needs solving. It is desired that only a low force is necessary to connect a nipple and a coupling, even if the nipple has residual pressure or not. In general, such a connection should possible using hand force alone. A tube with a nipple filled with fluid may be heated by the environment and that may be enough for raising the pressure so that the nipple cannot be connected to a coupling by hand force alone. It is therefore desirable to overcome these problems and improve the nipple, especially coaxial nipples.

It is also desirable to provide a nipple that is inexpensive to manufacture, is easy to manufacture, simple and quick to assemble, and is robust. The nipple must be able to fit existing couplings, i.e. replace older nipples. The nipple should comprise as few parts as possible, rendering good functionality and assembly and reliability. The nipple must also be able to be manufactured in different sizes. The present disclosure is directed to overcoming all of the problems as set forth above.

SUMMARY

The teachings of the present disclosure describe nipples for a coupling. For example, a nipple for a coupling may include a fluid passage (200); a housing (10); and a valve (210) for the fluid passage (200). The nipple further comprises a relief valve (220) for the valve (210), the relief valve (220) comprising a first sleeve (230) axially movable for sealing against a first seal (232) of the housing (10); a second sleeve (240) for sealing against a second seal (242) of the housing (10); and a third seal (222) for sealing between the first sleeve (230) and the second sleeve (240). Relative axial movement between the first sleeve (230) and the second sleeve (240) opens or closes, respectively by the direction of the axial movement, the relief valve (220). The first seal (232) and the third seal (222) are arranged, substantially, on the same radial distance (410) from a central axis (20) of the fluid passage (200).

As another example, a nipple for a coupling may include an inner fluid passage (100) and an outer fluid passage (200), the inner and outer fluid passages being coaxial; a housing (10); an inner valve (110) for the inner fluid passage (100); and an outer valve (210) for the outer fluid passage (200); an outer relief valve (220) for the outer valve (210), the outer relief valve (220) comprising a first sleeve (230) axially movable for sealing against a first seal (232) of the housing (10); a second sleeve (240) for sealing against a second seal (242) of the housing (10); and a third seal (222) for sealing between the first sleeve (230) and the second sleeve (240). Relative axial movement between the first sleeve (230) and the second sleeve (240) opens or closes, respectively by the direction of the axial movement, the outer relief valve (220). The first seal (232) and the third seal (222) are arranged, substantially, on the same radial distance (410) from a common axis (20) of the inner fluid passage (100) and the outer fluid passage (200).

In some embodiments, the nipple may further comprise a gap (238), between the first sleeve (230) and the second sleeve (240), for allowing fluid to pass there between. The first sleeve (230) and/or the second sleeve (240) may also, or in addition, comprise one or more pockets (247) for the fluid, and/or one or more passages (246) for the fluid. In some embodiments, a protrusion (239) may create the gap (238) between the first and second sleeves.

In some embodiments, the second sleeve (240) may be axially movable for sealing against the second seal (242) of the housing (10).

In some embodiments, the nipple may further comprise an inner relief valve (120) for the inner valve (110).

In some embodiments, the nipple may further comprise a locking groove (300) on an outer side of the housing (10), the locking groove being circumferential around the housing (10) and having a shape substantially as a combination of two intersecting and stepped U-shaped grooves. In some embodiments, the stepped U-shaped grooves of the locking groove (300) may be arranged and configured such that a ball, of a ball lock of a coupling, has two separate positions in the locking groove (300), e.g. such that the coupling with the ball lock must be pressed towards the nipple and subsequently push a locking sleeve of the coupling away from the nipple to unlock a coupling from the nipple.

In some embodiments, the nipple may be configured such that the first sleeve (230) seals against the first seal (232) in a position where the outer relief valve (220) is open, and an axial movement of the first sleeve (230) away from the first seal (232) moves the second sleeve (240).

In some embodiments, the first sleeve (230) and the second sleeve (240) may be complimentary shaped for the first sleeve (230) to connect to the second sleeve (240) when the first sleeve (230) is axially moved in to the nipple.

In some embodiments, the nipple may further comprise a spring (12) exerting a force to close the outer relief valve (220).

In some embodiments, the first sleeve (230) may have one or more first sleeve openings (234), and/or the second sleeve (240) may have one or more second sleeve openings (244).

In some embodiments, the first seal (232) may be held by the housing (10), and the third seal (222) may be held by the first sleeve (230).

As another example, some embodiments include a method to balance out an internal pressure acting on a relief valve of a nipple as described herein. The internal pressure acting on the relief valve of the nipple is balanced out by arranging two seals (232, 222) on substantially the same radial distance from a central axis of the nipple, each of the two seals (232, 222) sealing the same movable sleeve (230) for closing or opening the relief valve (220).

In some embodiments, one seal (232), of the two, may seal between the movable sleeve (230) and a housing (10) of the nipple, and the other seal (222) may seal between any internal pressure and a pressure of the external environment, for example 100 kPa.

In some embodiments, the method may further comprise a safety unlocking method between the nipple and a coupling (500). The coupling (500) may comprise a locking sleeve (510) and locking balls (520) for establishing a locked connection between the nipple and the coupling (500). The method may be for unlocking the coupling (500) and the nipple only when first (610) pushing the coupling (500) and the nipple towards each other, and secondly (620) pushing the locking sleeve (510) of the coupling (500) away from the nipple. In some embodiments, the locking sleeve (510) can rotate freely.

BRIEF DESCRIPTION OF THE DRAWINGS

The accompanying drawings illustrate exemplary embodiments of the teachings of the present disclosure, and together with the general description given above and the detailed description of the embodiments given below, serve to explain, by way of example, the principles of the disclosure.

FIG. 15 is a diagrammatic illustration of an example nipple and an example coupling in a relief venting position incorporating teachings of the present disclosure;

FIG. 16 is a diagrammatic illustration of a part of FIG. 15;

FIG. 17 is a diagrammatic illustration of a part of FIG. 15; and

DETAILED DESCRIPTION

Figure 1:
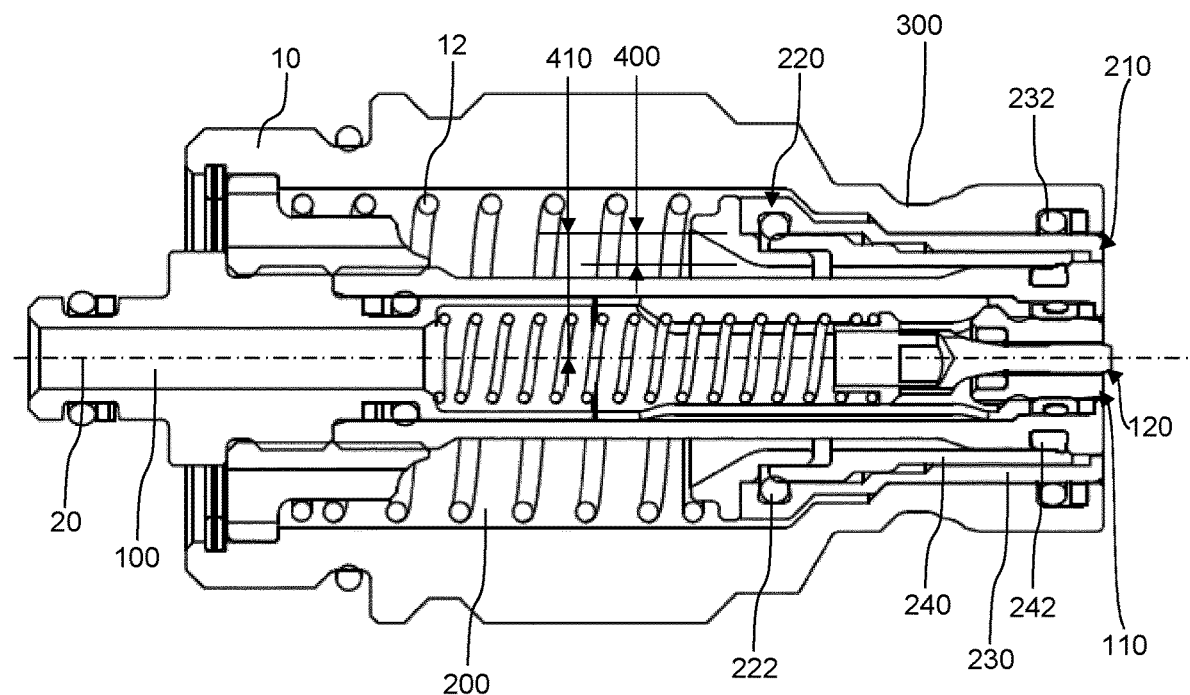
FIG. 1 is a diagrammatic illustration of an example nipple, disconnected from a coupling, incorporating teachings of the present disclosure.

The teachings of the present disclosure provide one or more solutions for a connection between a nipple and a coupling to be made with mere hand force, a force not exceeding 45 Newton, even a force less than 30 Newton will be enough for making the connection. Further, various embodiments include a nipple that is inexpensive to manufacture, is easy to manufacture, simple and quick to assemble, and is robust. The nipple will also be able to fit existing couplings, i.e. replace older nipples. The nipple according to the embodiments disclosed herein comprises only a few parts, and renders good functionality and assembly and reliability. The nipple can also be manufactured in different sizes.

Various embodiments of the teachings herein provide one or more solutions to the problems and disadvantages with the background art. Other technical advantages of the present disclosure will be readily apparent to one skilled in the art from the following description and claims. Each feature of the claims may be a separate feature. Various embodiments of the present application obtain only a subset of the advantages set forth. No one advantage is critical to the embodiments. Any disclosed embodiment may be technically combined with any other disclosed embodiment and embodiments.

FIGS. 1-4 is a diagrammatic illustration of an example nipple incorporating teachings of the present disclosure. FIGS. 5-8 is a diagrammatic illustration of another example nipple incorporating teachings of the present disclosure. FIGS. 9-12 is a diagrammatic illustration of another nipple incorporating teachings of the present disclosure. The same reference numbers have been used throughout the three embodiments for the same features. The description of the first embodiment corresponds mutatis mutandis to the other two embodiments.

The nipple may be for high pressure, for example up to 700 bar, 70000 kPa, or up to 4000 bar, 400000 kPa, and can operate above 50000 kPa, while the external environment may be about 100 kPa, for example atmospheric pressure at sea level. For easy understanding, a coupling is also illustrated in the drawings so one may take from the drawing how the nipple and the coupling interact and the function of relief valves. The nipple and the coupling are shown as a cut through their cylindrical bodies, and the cut is along their central axes.

The three exemplary embodiments show the same principle of how relief venting may be achieved for an outer passage for a coaxial nipple. The three exemplary embodiments show the same principle of how to balance the relief valve against residual pressure of the nipple. The nipple corresponds to a male part and the coupling corresponds to a female part, and the male part and female part can be coupled together and disconnected. The nipple in the embodiments illustrated by FIGS. 1-12 is a coaxial nipple. The nipple may be a coaxial nipple or a nipple with just one passage, see FIG. 14, or with more than two passages. The nipple may be for a fluid, such as air, gas, liquid, hydraulic fluids, etc. The nipple may be for a quick connect coupling. The nipple may be part of a hydraulic tool, such as a torque wrench. This would allow a coupling with a co-axial hose to be connected to such a hydraulic tool.

Turning to the first exemplary embodiment as illustrated in FIGS. 1-4, the nipple comprises an inner fluid passage (100) and an outer fluid passage (200), the inner and outer fluid passages being coaxial. The outer fluid passage (200) may be shaped as a hollow cylinder around the inner fluid passage (100), and the inner fluid passage may be shaped as a cylinder. The nipple is a co-axial nipple, but this disclosure and embodiments also apply to a nipple with only one fluid passage as in FIG. 14. The nipple further comprises a housing (10); an inner valve (110) for the inner fluid passage (100); and an outer valve (210) for the outer fluid passage (200). The inner and outer fluid passages (100, 200) are through openings of the nipple with the inner and outer valves (110, 210) at one end of the nipple. This is the end that is connectable with a coupling. The other end is for example connected to a tool, pump, or hose. The housing (10) as shown has a substantial cylindrical shape with an axis. The nipple housing (10) may be made out of one single piece. The housing (100) may be made out of, for example, stainless steel, zinc plated or chemically nickel-plated steel.

The nipple further comprises an outer relief valve (220) for the outer valve (210). The outer relief valve (220) comprises a first sleeve (230) axially movable for sealing against a first seal (232) of the housing (10); a second sleeve (240), e.g. axially movable, for sealing against a second seal (242) of the housing (10); and a third seal (222) for sealing between the first sleeve (230) and the second sleeve (230). The first sleeve (230) and the second sleeve (240) may be substantially cylindrical in shape. Relative axial movement between the first sleeve (230) and the second sleeve (240) opens or closes, respectively by the direction of the axial movement, the outer relief valve (220). The first seal (232), the second seal (242), and the third seal (222) may be circumferential and elastic, such as, for example, an o-ring, an x-ring, or a circumferential seal with a lip. The third seal (222) may be arranged substantially at one end of the first sleeve (230). A spring (12) may be arranged inside the nipple to force one of the first or second sleeve (230, 240) to close the outer relief valve (220). In this way an outer relief valve (220) may be realised in a nipple where it is technically difficult to arrange a relief valve and not much space is available.

The first seal (232) and the third seal (222) are arranged, substantially, on the same radial distance (410) from a common axis (20) of the inner fluid passage (100) and the outer fluid passage (200). By substantially arranging the first seal (232) and the third seal (222) on the same radial distance from the common axis (20) of the inner fluid passage (100) and the outer fluid passage (200) the outer relief valve (220) is balanced. This means that a variation of residual pressure in the nipple does not change the force required to open the outer relief valve (220). If the residual pressure is low, or if the residual pressure is high, substantially, the same low force is required to open the outer relief valve (220). The force required to open the outer relief valve (220) may be substantially equal to the force to overcome the spring force of the spring (12). To this may naturally come minor additional forces from internal friction between moving parts and against seals, but they can largely be neglected as they can easily be overcome by hand force. The required force to open the outer relief valve (220) is no more than hand force, less than 45 Newton, or even a force less than 30 Newton.

As may best be taken from FIG. 1, the first seal (232) and the third seal (222) are arranged, substantially, on the same radial distance (410) from a common axis (20) of the inner fluid passage (100) and the outer fluid passage (200). A radial distance (400), between the first seal (232) and the second seal (242), indicates the circumferential area on which an internal residual pressure in the nipple forces the outer valve (210) to close, which is the force necessary to open the outer valve (210), unless there is an outer relief valve to relieve that pressure. The radial distance (400) indicates the circumferential area that any residual pressure, and spring force from spring (12), forces the first sleeve (230) and the second sleeve (240) outwards, towards the coupling. Since the first seal (232) and the third seal (222) have the same radial distance (410) from the central axis (20) of the co-axial nipple there is no radial distance and no circumferential area on which any residual pressure can act to force the first sleeve (230) outwards, towards the coupling. This arrangement of the first seal (232) and the third seal (222) balances the first sleeve (230) resulting that there is no force to overcome to push the first sleeve (230) inwards into the nipple when there is a residual pressure within the nipple. If there is a spring (12) then only the spring force has to be overcome, and the amount of friction between the moving parts and seals can be disregarded. This way of balancing out the internal pressure so that the outer valve (210) can easily be opened, by opening the outer relief valve (220), by hand force is present and illustrated in all three embodiments in FIGS. 1-12 and in FIGS. 14-17.

Figure 2:
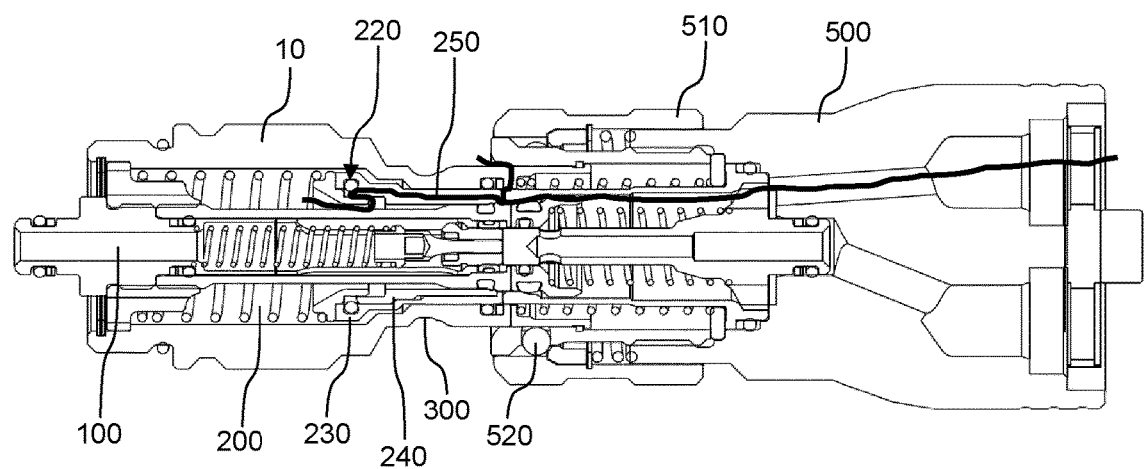
FIG. 2 is a diagrammatic illustration of an example nipple and an example coupling in a relief venting position incorporating teachings of the present disclosure.

FIG. 2 is an exemplary diagrammatic illustration of the nipple and a coupling in a relief venting position. The coupling (500) may have a locking sleeve (510) and locking balls (520) for establishing a locked connection between the nipple and coupling. In FIG. 2 the coupling (500) has pushed the first sleeve (230) into the nipple a short distance, for example less than 1, 2, 3, or 5 millimetres. Moving the first sleeve (230) to the left in FIG. 1 opens the outer relief valve (220), as the third seal (222) is moved away from its sealing position between the first sleeve (230) and the second sleeve (240). Any residual internal pressurised fluid may then escape out of the nipple along the path (250) illustrated in FIG. 2. The pressure is relieved along the path (250) between the first sleeve (230) and the second sleeve (240). Thereafter the fluid may escape between the nipple and the coupling or/and further relieved into a channel, for example the return channel, of the coupling since the valve opens and the return line may be open to a tank. Once any residual internal pressure is vented, the coupling (500) can be pushed further onto the nipple. The venting and the final connection can thus be made by hand force alone, because any residual internal pressure in the nipple is vented.

Figure 3:
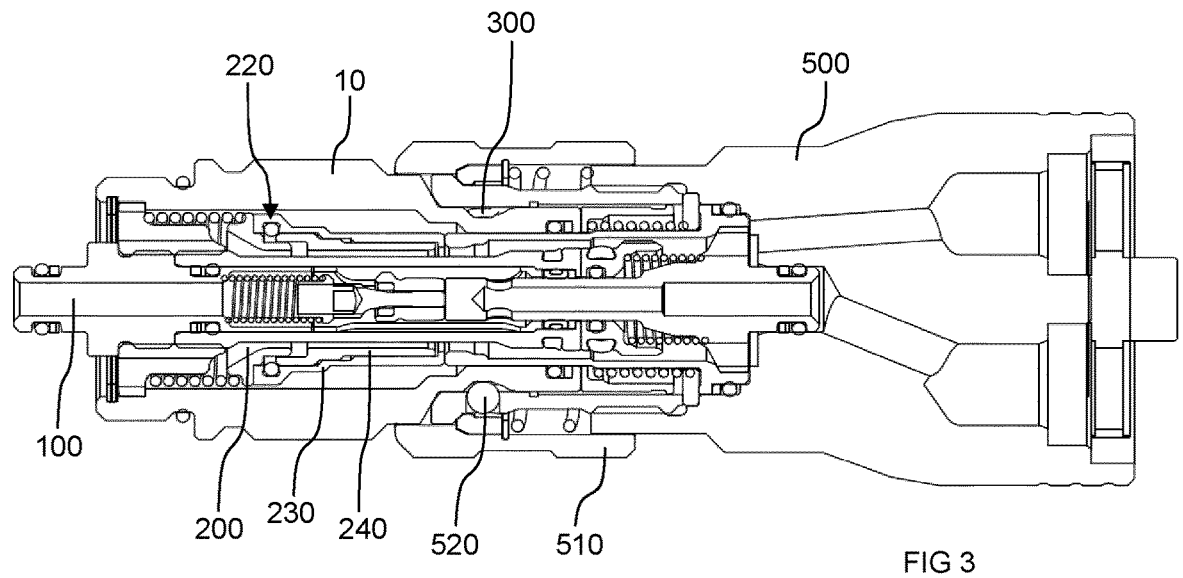
FIG. 3 is a diagrammatic illustration of an example nipple and an example coupling in a locked position incorporating teachings of the present disclosure.

FIG. 3 is an exemplary diagrammatic illustration of the nipple and the coupling in a locked position. Here the locking balls (520) are in the lower part of the locking groove (300), and the locking sleeve (510) prevents the locking balls (520) to be moved radially outwards. The inner fluid passage (100) and the outer fluid passage (200) are fully connected and open to allow fluid to flow between the nipple and the coupling.

Figure 4:
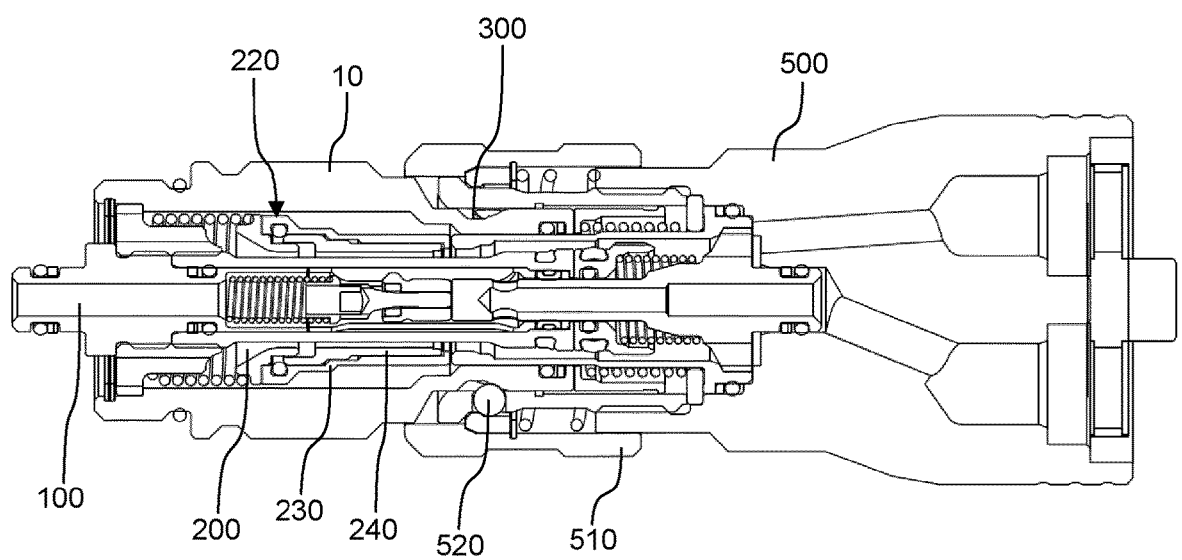
FIG. 4 is a diagrammatic illustration of an example nipple and an example coupling in a connected safety position incorporating teachings of the present disclosure.

FIG. 4 is an exemplary diagrammatic illustration of the nipple and the coupling in a connected safety position. The nipple and the coupling are about to be disconnected, but can only be disconnected if a safety procedure, a specific movement, is followed. This specific movement is caused by the shape of the locking groove (300). The movement comprises first pushing the coupling (500) and the nipple towards each other, and secondly pushing the locking sleeve (510) of the coupling (500) away from the nipple. Only then can the coupling (500) and the nipple be unlocked. This avoids accidental disconnection and ensures safe venting during connection and disconnection. The shape of the locking groove may the same in any embodiments. The FIGS. 1-12 all describe the same locking groove.

The locking groove (300) is on an outer side of the housing (10). The locking groove (300) is circumferential around the housing (10). As may be taken from all figures, perhaps best from FIG. 1, the locking groove (300) may have a shape substantially as a combination of two intersecting and stepped U-shaped grooves. The two U-shaped grooves intersect each other partially and are stepped in depth in relation to each other. The depth is in the radial direction. The stepped difference may be half the depth of the U-shape. The deeper part of the U-shaped groove is away from the end of the nipple where the valves are.

The locking groove (300) may be an asymmetric U-shape. The locking groove (300) may be an indent with asymmetrically curved profile. The locking groove (300) may be a half teardrop arranged horizontally on the outer side of the housing (10). The locking groove may be a combination of one or more of the above. The deeper part of the locking groove (300) allows the locking balls (520) to lock the nipple and the coupling in a fully connected position. The U-shaped part of the locking groove (300) that is not so deep still allows the locking balls (520) to grip the housing (10) of the nipple. This shape of the locking groove (300) prevents that nipple and coupling to be accidentally disconnected. The shape of the locking groove (300) works with any ordinary coupling having locking balls (520).

When the nipple and the coupling are to be disconnected, the shape of the locking groove (300) still allows the balls to be held in the locking groove (300) such that the coupling (500) with a ball lock must be pressed towards the nipple and subsequently the locking sleeve (510) of the coupling must be pushed away from the nipple to unlock the coupling from the nipple. That is, the locking groove (300) makes it possible for the locking balls (520) to fit in each U-shape in two separately positions, and by this shape of the locking groove (300) this safety function is achieved. The safety functions is that in addition to the usual disconnection between the nipple and the coupling, the shape of the locking groove (300) makes it necessary that the coupling (500) is pressed towards the nipple and subsequently the locking sleeve (510) of the coupling (500) must be pushed away from the nipple to unlock the coupling (500) from the nipple. To perform this disconnection a user needs to use two hands. The shape of the locking groove (300) makes thus an accidental disconnection impossible. This results in a nipple that safely vents any residual pressure, i.e. a nipple that is safe and has a relief vent for the outer fluid passage (200).

Figure 14:
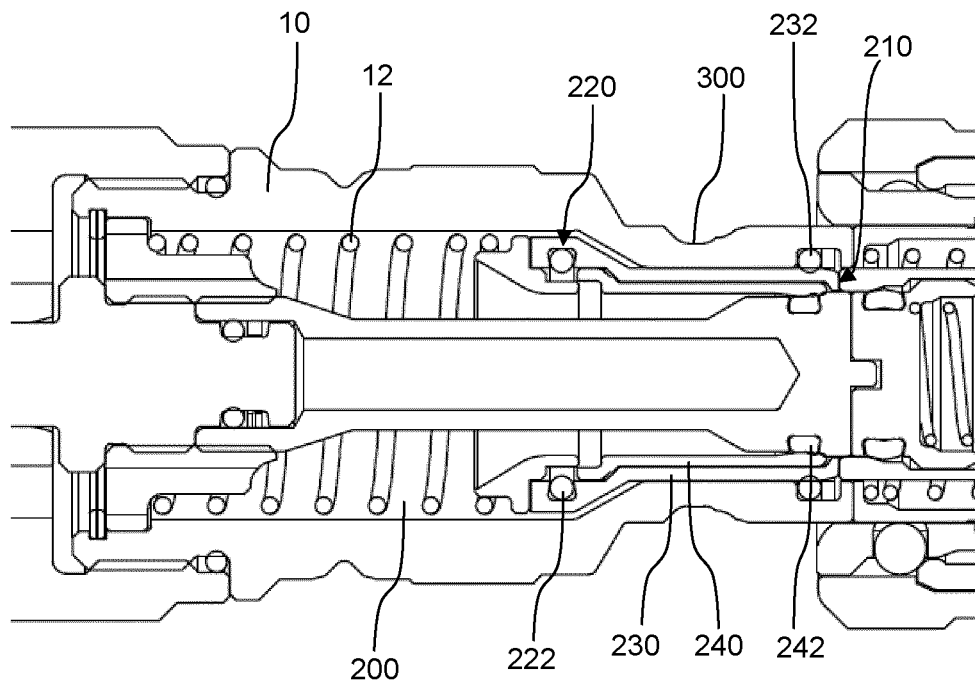
FIG. 14 is a diagrammatic illustration of an example nipple and an example coupling in a relief venting position incorporating teachings of the present disclosure.

In some embodiments, the nipple comprises a passage (200), for example only one single passage (200). An exemplary embodiment illustrating a schematic cross cut view of the embodiment is shown by FIG. 14. The nipple further comprises a housing (10) and a valve (210) for the fluid passage (200). The nipple further comprises a relief valve (220) for the valve (210), and the relief valve (220) comprises a first sleeve (230) axially movable for sealing against a first seal (232) of the housing (10); a second sleeve (240) for sealing against a second seal (242) of the housing (10); and a third seal (222) for sealing between the first sleeve (230) and the second sleeve (240).

FIG. 14 illustrates the nipple when the coupling has opened the relief valve (220), allowing any over pressure in the fluid passage (200) to vent out. The relative axial movement between the first sleeve (230) and the second sleeve (240) opens or closes, respectively by the direction of the axial movement, the relief valve (220). The first seal (232) and the third seal (222) are arranged, substantially, on the same radial distance from a central axis of fluid passage (200), as also described above with reference to FIG. 1. In this way the same balancing as explained above is achieved. In this embodiment, the nipple may comprise only one fluid passage (200). Other embodiments with three or four fluid passages may also be used. The nipple with two fluid passages, the coaxial nipple, is described with reference to FIGS. 1-4. The nipple with only one fluid passage is described with reference to FIG. 14. The embodiments in FIGS. 1-4 and 14 of the relief valve work correspondingly in the same way. The relief valve (220) works with only one valve or more valves, i.e. with one or more fluid passages. The relief valve (220) could be adapted for a coupling.

In some embodiments, that may be taken in combination with any other embodiment disclosed herein, the nipple, for one or more fluid passages, may further comprising a gap (238), between the first sleeve (230) and the second sleeve (240), for allowing fluid to pass there between. The gap (238) allows fluid to pass between the first sleeve (230) and the second sleeve (240). The gap (238) may be a difference in size between the inner diameter of the first sleeve (230) and the outer diameter of the second sleeve (240).

The gap (238) may be realised by, for example, any kind of protrusions (239), obstructions, or openings between the first sleeve (230) and the second sleeve (240) so that the two sleeves do not contact each other over the whole contact area that the outer first sleeve (230) otherwise makes with the inner second sleeve (240). The gap (238), the distance between the first sleeve (230) and the second sleeve (240), may be for example 0.1 mm, or 0.1 to 0.3 mm, or 0.1 to 0.5 mm. The protrusion (239) may be protruding only, or in addition to other protrusions, in the axial direction. This would prevent the ends of the sleeves (230, 240), for example when the sleeves are substantially L-shaped and/or have flanges at their ends, to close completely and allow fluid to pass, even if axial forces tries to close them, such as the force of any residual fluid pressure and/or the hand force opening the relief valve (220). These embodiments allow fluid to more easily pass between the first sleeve (230) and the second sleeve (240) when the relief valve (220) is being opened, because the two sleeves (230, 240) leaves a small opening at their ends.

FIG. 15 illustrates the nipple when the coupling has opened the relief valve (220), allowing any over pressure in the fluid passage (200) to vent out. The two encircled details in FIG. 15 are enlarged and shown in larger scale as FIGS. 16 and 17. As may be taken from FIGS. 16 and 17 the flanges at the ends of the first sleeve (230) and the second sleeve (240) do not close against each other. That is, there is a gap (238), and opening between the two sleeves at the end and this allows fluid to pass there between even if the two sleeves are pressed together against each other.

In FIG. 17 the gap (238) has been indicated twice; once as the gap (238) between the inner diameter of the first sleeve (230) and the outer diameter of the second sleeve (240); and once as the distance between the end of second sleeve (240) and an inwards protruding flange at the end of the first sleeve (230). These two gaps (238) can be independent of each other or combined. Without a gap (238) the fluid must force the first sleeve (230) and the second sleeve (240) slightly apart to make a passage for the fluid. This becomes difficult when the residual pressure is high. With a gap (238) the fluid has a way to vent out also when the residual pressure is high.

When any residual fluid pressure in the nipple is over 300 kPa, 30 bars it is preferred that there is a gap (238) between the first sleeve (230) and the second sleeve (240), because this allows the fluid to pass more easily there between. A gap (238) makes it easier to connect a coupling to the nipple when the pressure in the nipple is high, over 3000 kPa, 30 bars, or over 3500 kPa, 35 bars, or 3000-6000 kPa, 30-60 bars. The gap (238) makes it possible to open a nipple with only hand force when the internal residual pressure in the nipple is up to 12000 kPa, 120 bars. With the gap (238) the relief valve (220) still seals because the second sleeve (240) still engages the third seal (222).

Figure 18:
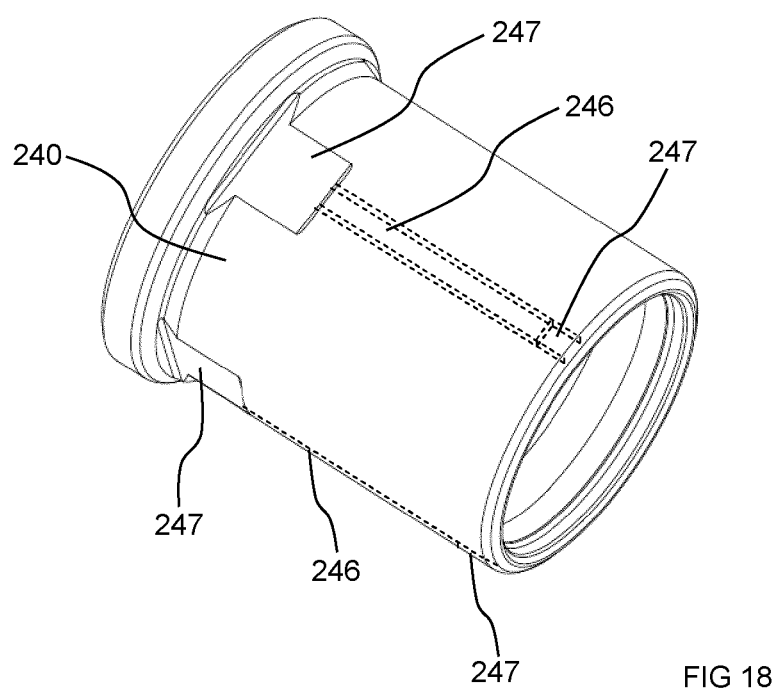
FIG. 18 is a diagrammatic illustration of an inner sleeve incorporating teachings of the present disclosure.

In some embodiments, in combination with the previous embodiment or not, or in combination with any other embodiment disclosed herein, the first sleeve (230) and/or the second sleeve (240) may comprise one or more pockets (247) for the fluid, and/or one or more passages (246) for the fluid. An exemplary embodiment hereof is illustrated in FIG. 18, where the second sleeve (240) may comprise, on the outside, one or more pockets (247) and/or one or more passages (246). The first sleeve (230) may comprise, on the inside, corresponding one or more pockets and/or one or more passages.

The one or more pockets (247) and/or the one or more passages (246) may be formed by removing material from the first sleeve (230) and/or the second sleeve (240). The one or more pockets (247) in the sleeves may be substantially shaped as squares, circles, or polygons. The one or more pockets (247) may start from the end, facing away from where the coupling connects to the nipple, of the first sleeve (230) and/or the second sleeve (240). The one or more pockets (247) and/or one or more passages (246) may open up to a fluid passage (200) of the nipple. The one or more passages (246) may be channels, conduits, or grooves that allow the fluid to flow within the passages (246). The one or more pockets (247) and/or one or more passages (246) may be on the inside of the outer first sleeve (230) and/or on the outside of the inner second sleeve (240). The one or more passages (246) and/or the pockets (247) may be 0.25 mm deep, or 0.1 to 1 mm deep, thus not going completely through the sleeves in the radial direction.

The second sleeve (240) may have two, three, or four pockets (247) arranged symmetrically around one end, or at both ends, of the second sleeve (240). The one or more pockets (247) may connect to the one or more passages (246), with the one or more pockets (247) at one end and the one or more passages (246) extending in the axial direction of the first sleeve (230) and/or the second sleeve (240). For example, and as illustrated by FIG. 18, the passages (246) may connect to one pocket (247) at one end and/or with another pocket (247) at the other end, the passages (246) extending in the axial direction of the first sleeve (230) and/or the second sleeve (240). FIG. 18 illustrates an exemplary embodiment with the pockets (247) and the passages (246) on the outside of the second, inner, sleeve (240). The first, outer, sleeve (230) may instead, or in combination, have corresponding pockets and passages on the inside. Both the first sleeve (230) and the second sleeve (240) may have one or more pockets and/or one or more passages (246), or only one of the sleeves.

Turning to the second example embodiment, as shown in FIGS. 5-8, the principle of arrangement of the first seal (232) and the third seal (222) to balance the outer relief valve (220) is similar to the first embodiment. The second embodiment is similar to the first embodiment, and the reference numbers in the second embodiment corresponds to the reference numbers of the first embodiment.

The outer fluid passage (200) has an outer relief valve (220). This outer relief valve (220) comprises a first sleeve (230) axially movable for sealing against a first seal (232) of the housing (10), and a second sleeve (240) for sealing against a second seal (242) of the housing (10). The outer relief valve (220) comprises a third seal (222) for sealing between the first sleeve (230) and the second sleeve (230), wherein relative axial movement between the first sleeve (230) and the second sleeve (240) opens or closes, respectively by the direction of the axial movement, the outer relief valve (220), the first seal (232) and the third seal (222) being arranged, substantially, on the same radial distance (410) from a common axis (20) of the inner fluid passage (100) and the outer fluid passage (200). A spring (12) may push the second sleeve (240) towards the valves of the nipple, thereby closing the outer relief valve (220).

In this second embodiment, the relief valve (220) comprises the third seal (222), a ball (222), sealing an opening (224) in the second sleeve (240). The first sleeve (230) can push the ball (222) so that the relief valve (220) opens. The ball (222) may be a steel ball. In the opening (224) there may be arranged a pin (226) that can push the ball (222) against a sealing surface in the opening (224) of the second sleeve (240). The spring (12) may push the pin (226) as well as the second sleeve (240), for example when the ball (222) is pushed to seal the opening (224) then the spring (12) pushes indirectly the second sleeve (240) also in the same direction towards the valves of the nipple.

A third sleeve (241) may be arranged between the spring (12) and the pin (226) and the second sleeve (240). The spring (12) may engage the third sleeve (241), which pushes initially the pin (226), which pushes the ball (222) against the sealing surface in the opening (224) of the second sleeve (240). Hereby the relief valve (220) is always closed, unless it is opened with the first sleeve (230). The first sleeve (230) can easily open the relief valve (220), that is moving the ball (222) away from the sealing surface in the opening (224), because the pressure area of the ball (222) is very small compared with the pressure area of the whole second sleeve (240). No residual pressure is acting on the first sleeve (230), because any residual pressure in the outer fluid passage (200) is held back by the ball (222) and the second sleeve (240).

Any residual pressure acting on the first sleeve (230) can escape out between the first sleeve (230) and the inner tube of the housing (10). As may be best taken from FIG. 5, the first seal (232) and the third seal (222) are arranged, substantially, on the same radial distance (410) from a common axis (20) of the inner fluid passage (100) and the outer fluid passage (200). Any residual pressure, and spring force from spring (12), forces the first sleeve (230) and the second sleeve (240) outwards, towards the coupling. This arrangement results in that there is no force to overcome to push the first sleeve (230) inwards into the nipple when there is a residual pressure within the nipple. If there is a spring (12) then only the spring force has to be overcome, and the amount of friction between the moving parts and seals can be disregarded.

Figure 6:
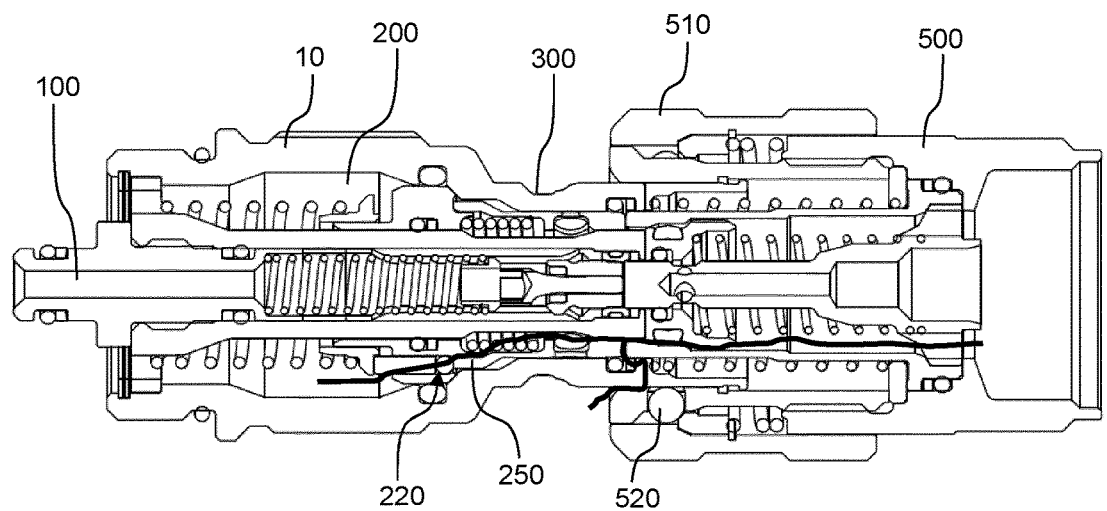
FIG. 6 is a diagrammatic illustration of an example nipple and an example coupling in a relief venting position incorporating teachings of the present disclosure.

FIG. 6 is an exemplary diagrammatic illustration of the nipple and a coupling in a relief venting position according to the second exemplary embodiment. The coupling (500) may have a locking sleeve (510) and locking balls (520) for establishing a locked connection between the nipple and coupling. In FIG. 6, the coupling (500) has pushed the first sleeve (230) into the nipple a short distance, for example less than 1, 2, 3, or 5 millimetres. Moving the first sleeve (230) to the left in FIG. 6 opens the outer relief valve (220), as the third seal (222), the ball (222), is moved away from its sealing position. Any residual internal pressure may then escape out of the nipple along the path (250) illustrated in FIG. 6. The pressure is relieved along the path (250) through the opening (224) and further out between the first sleeve (230) and the second sleeve (240). Thereafter the fluid may escape between the nipple and the coupling or/and further relieved into a channel, for example the return channel, of the coupling since the valve opens and the return line may be open to a tank. Once any residual internal pressure is vented, the coupling (500) can be pushed further onto the nipple. The venting and the final connection can thus be made by hand force alone, because any residual internal pressure in the nipple is vented.

Figure 7:
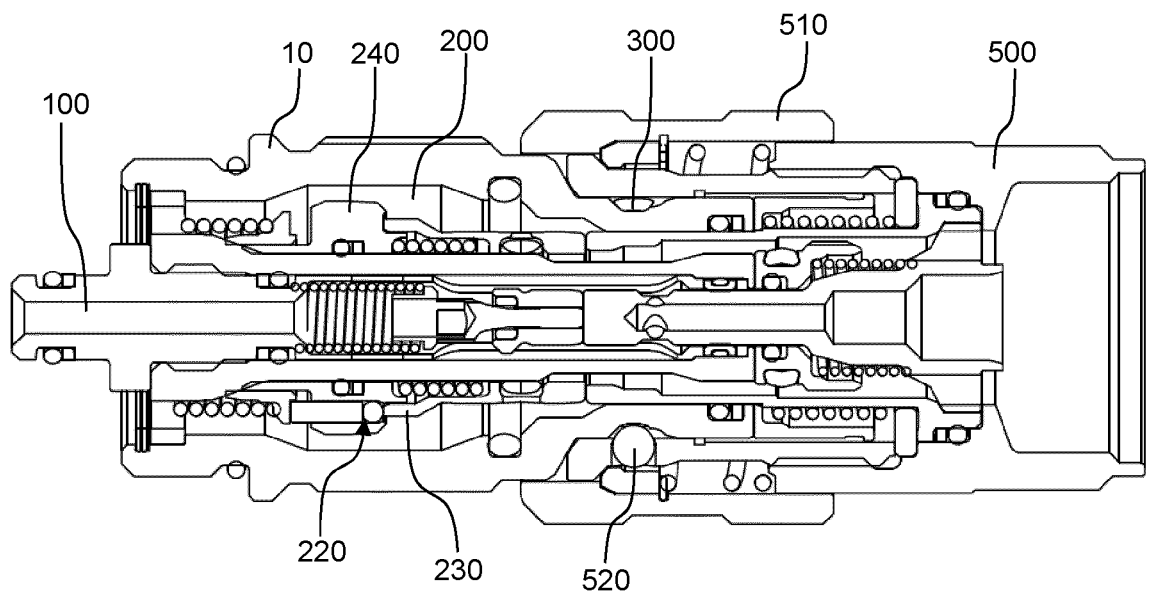
FIG. 7 is a diagrammatic illustration of an example nipple and an example coupling in a locked position incorporating teachings of the present disclosure.

FIG. 7 is an exemplary diagrammatic illustration of the nipple and the coupling in a locked position according to the second exemplary embodiment. Here the locking balls (520) are in the lower part of the locking groove (300), and the locking sleeve (510) prevents the locking balls (520) to be moved radially outwards. The inner fluid passage (100) and the outer fluid passage (200) are fully connected and open to allow fluid to flow between the nipple and the coupling.

Figure 8:
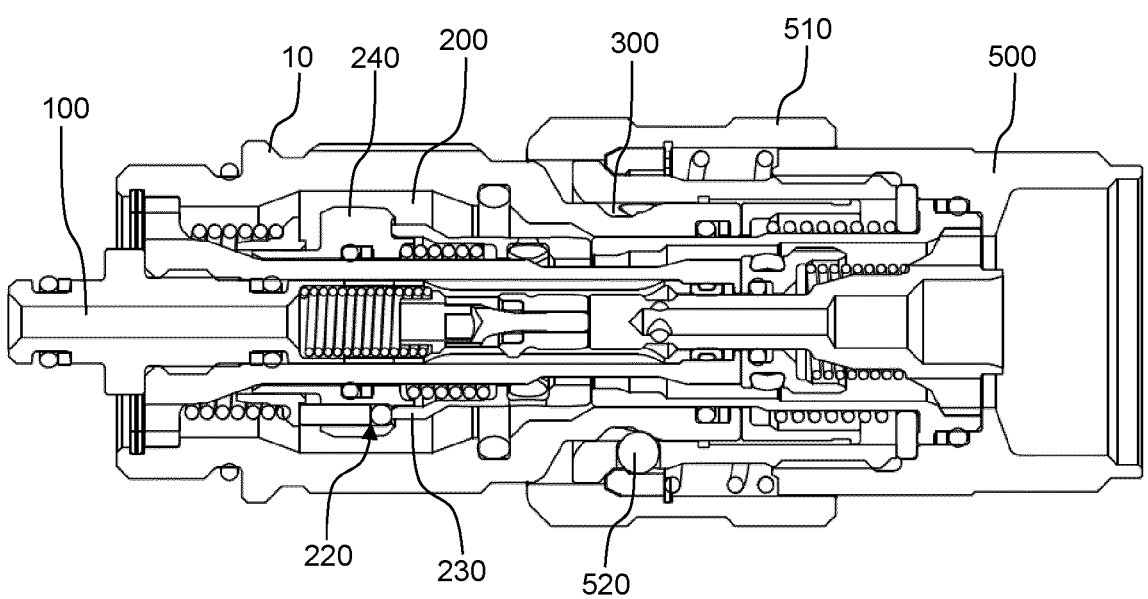
FIG. 8 is a diagrammatic illustration of an example nipple and an example coupling in a connected safety position incorporating teachings of the present disclosure.

FIG. 8 is an exemplary diagrammatic illustration of the nipple and the coupling in a connected safety position according to the second exemplary embodiment of the present disclosure. The nipple and the coupling are about to be disconnected, but can only be disconnected if a safety procedure, a specific movement, is followed. This specific movement is caused by the shape of the locking groove (300). The movement comprises first pushing the coupling (500) and the nipple towards each other, and secondly pushing the locking sleeve (510) of the coupling (500) away from the nipple. Only then can the coupling (500) and the nipple be unlocked. This avoids accidental disconnection. The shape of the locking groove, and the resulting functions of the shape, are the same in all three embodiments. The FIGS. 1-12 all describe the same locking groove.

Turning to the third embodiment, as shown in FIGS. 9-12, the principle of arrangement of the first seal (232) and the third seal (222) to balance the outer relief valve (220) is the same as in the first embodiment. Keeping the same radial distance from the axis (20) to the first seal (232) and to the third seal (222) allows the first sleeve (230) to be balanced. This results in that there is no force to overcome to push the first sleeve (230) inwards into the nipple when there is a residual pressure within the nipple. This principle is the same in all three embodiments illustrated by FIGS. 1-12. The third embodiment is similar to the first and second embodiments, and the reference numbers in the third embodiment corresponds to the reference numbers of the first and second embodiments.

The outer fluid passage (200) has an outer relief valve (220). This outer relief valve (220) comprises a first sleeve (230) axially movable for sealing against a first seal (232) of the housing (10), and a second sleeve (240) for sealing against a second seal (242) of the housing (10). The outer relief valve (220) comprises a third seal (222) for sealing between the first sleeve (230) and the second sleeve (230). The third seal (222) may comprise two seals (222), for example two o-rings. Relative axial movement between the first sleeve (230) and the second sleeve (240) opens or closes, respectively by the direction of the axial movement, the outer relief valve (220). The first seal (232) and the third seal (222), or the first seal (232) and both the two third seals (222), are arranged, substantially, on the same radial distance (410) from a common axis (20) of the inner fluid passage (100) and the outer fluid passage (200). A spring (12) may push the first sleeve (230) towards the valves of the nipple, thereby closing the outer relief valve (220).

In the third embodiment, the first sleeve (230) comprises a first sleeve opening (234), and the second sleeve (240) comprises a second sleeve opening (244). The two openings may be in the radial direction. The first sleeve (230) can be pushed into the nipple by hand force, because the first seal (232) and the third seal (222) are arranged, substantially, on the same radial distance (410) from the common axis (20) of the inner fluid passage (100) and the outer fluid passage (200). When the first sleeve moves to the left from the position illustrated in FIG. 9 to the position illustrated in FIG. 10, then the first sleeve opening (234) has passed the third seal (222) so much as to allow any residual pressure in the outer fluid passage (200) to vent out from the nipple.

Figure 10:
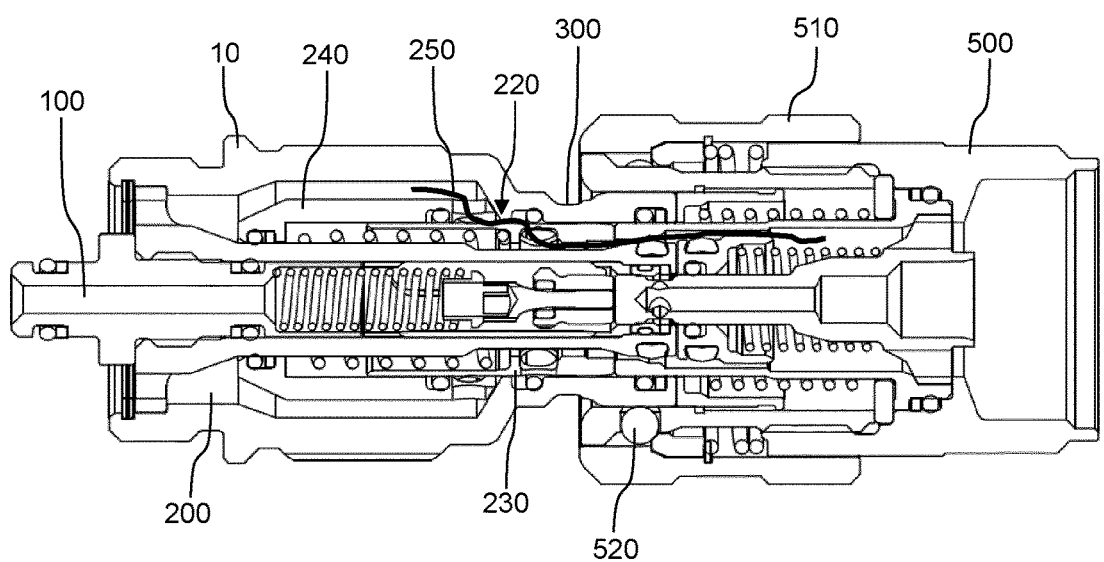
FIG. 10 is a diagrammatic illustration of an example nipple and an example coupling in a relief venting position incorporating teachings of the present disclosure.

FIG. 10 is an exemplary diagrammatic illustration of the nipple and a coupling in a relief venting position according to the third exemplary embodiment of the present disclosure. The coupling (500) may have a locking sleeve (510) and locking balls (520) for establishing a locked connection between the nipple and coupling. In FIG. 10 the coupling (500) has pushed the first sleeve (230) into the nipple a short distance. Moving the first sleeve (230) to the left in FIG. 10 opens the outer relief valve (220), as a part of the first sleeve opening (234) of the first sleeve (230) is moved passed the third seal (222) to allow any residual internal pressure to escape out of the nipple along the path (250) illustrated in FIG. 10. Thereafter the fluid may escape between the nipple and the coupling, or/and further relieved into a channel, for example the return channel, of the coupling since the valve opens and the return line may be open to a tank. As may be taken from FIG. 10, any internal pressure of the nipple may vent out between the nipple and the coupling, and/or vent out into the coupling back to a tank, if the coupling allows that. The pressure is relieved along the path (250) between the first sleeve (230) and the second sleeve (240). Once any residual internal pressure is vented, the coupling (500) can be pushed further onto the nipple. The venting and the final connection can thus be made by hand force alone, because any residual internal pressure in the nipple is vented.

Figure 11:
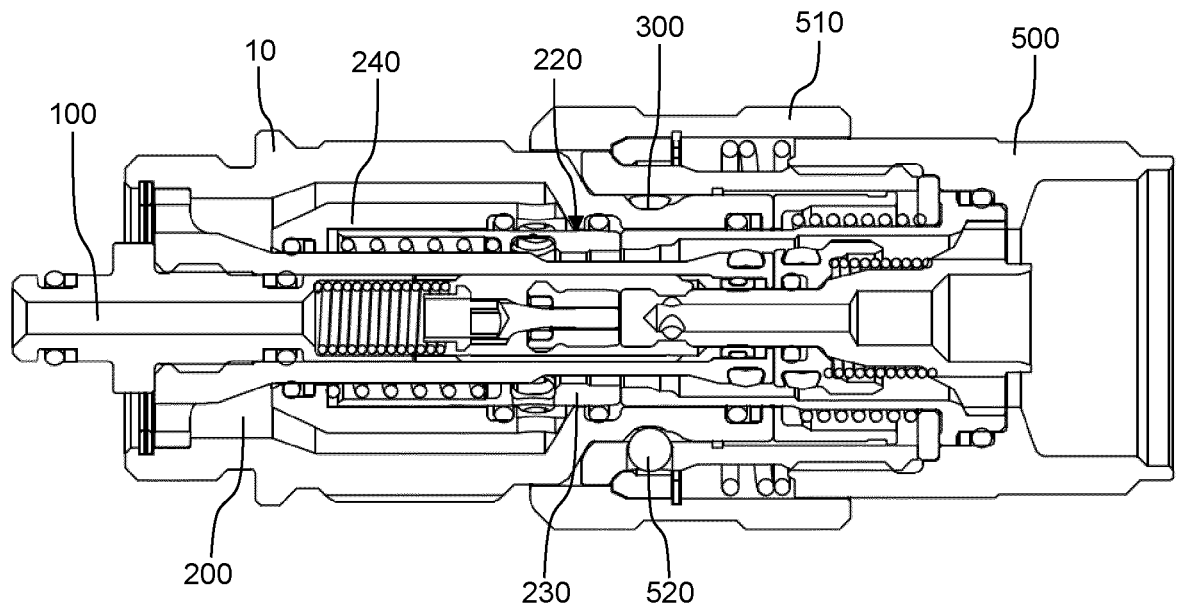
FIG. 11 is a diagrammatic illustration of an example nipple and an example coupling in a locked position incorporating teachings of the present disclosure.

FIG. 11 is an exemplary diagrammatic illustration of the nipple and the coupling in a locked position according to the third exemplary embodiment of the present disclosure. Here the locking balls (520) are in the lower part of the locking groove (300), and the locking sleeve (510) prevents the locking balls (520) to be moved radially outwards. The inner fluid passage (100) and the outer fluid passage (200) are fully connected and open to allow fluid to flow between the nipple and the coupling.

Figure 12:
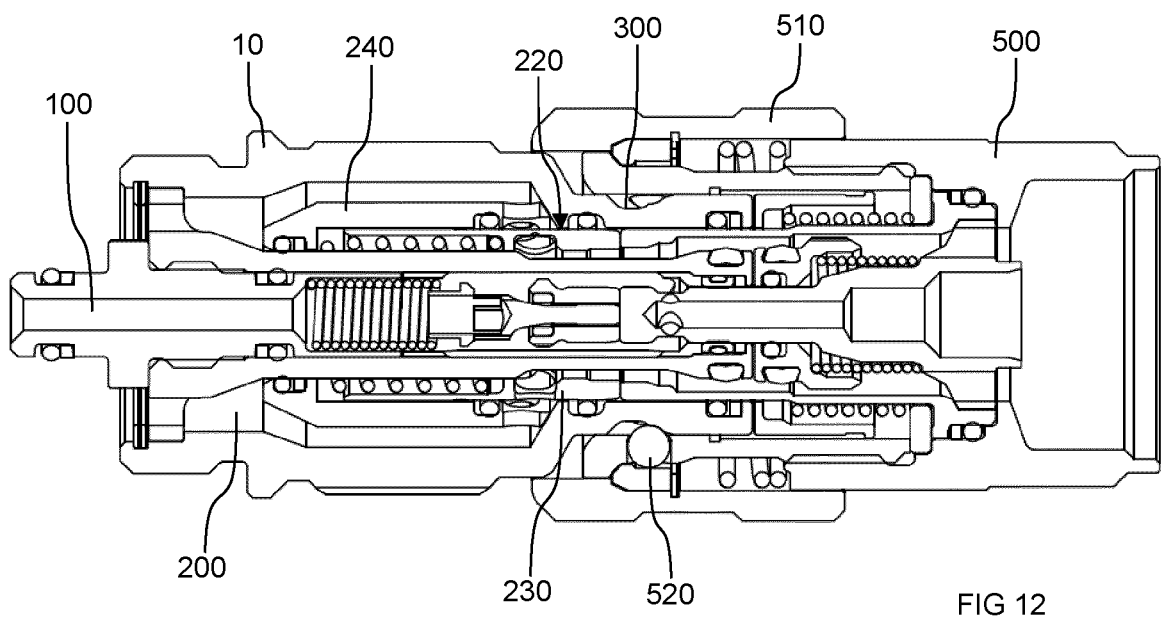
FIG. 12 is a diagrammatic illustration of an example nipple and an example coupling in a connected safety position incorporating teachings of the present disclosure.

FIG. 12 is an exemplary diagrammatic illustration of the nipple and the coupling in a connected safety position according to the third exemplary embodiment of the present disclosure. The nipple and the coupling are about to be disconnected, but can only be disconnected if a safety procedure, a specific movement, is followed. This specific movement is caused by the shape of the locking groove (300). The movement comprises first pushing the coupling (500) and the nipple towards each other, and secondly pushing the locking sleeve (510) of the coupling (500) away from the nipple. Only then can the coupling (500) and the nipple be unlocked. This avoids accidental disconnection. The shape of the locking groove, and the resulting functions of the shape, are the same in all three embodiments. The FIGS. 1-12 all describe the same locking groove.

As may be taken from all FIGS. 1-12, the principle of arrangement of the first seal (232) and the third seal (222) to balance the outer relief valve (220) is the same. Keeping the same radial distance from the axis (20) to the first seal (232) and to the third seal (222) allows the first sleeve (230) to be balanced, i.e. there is no internal pressure that forces the first sleeve (230) outwards from the nipple. The first seal (232) has the function to seal between the first sleeve (230) and the housing (10) at the outer end of the nipple, where the valves are. The third seal (222) has the function to seal the relief valve (220), between the first sleeve (230 and the second sleeve (240). To configure the nipple with the same radial distance from the axis (20) to the first seal (232) and to the third seal (222) in all three embodiments results in that there is no force to overcome to push the first sleeve (230) inwards into the nipple when there is a residual pressure within the nipple. This principal is the same for a nipple with one or more fluid passages.

In some embodiments, the second sleeve (240) is axially movable for sealing against the second seal (242) of the housing (10). The second seal (242) may be arranged on the housing (10) between the two co-axial inner and outer fluid passages (100, 200). The first seal (232) and the second seal (242) may be arranged at the end of the nipple, at the valves, and seal the outer valve (210). They may be coaxial and the first seal (232) may be the outer seal and the second seal (242) may be the inner seal, and the first sleeve (230) and/or the second sleeve (240) may be sealed between these two seals.

In some embodiments, the nipple may further comprise an inner relief valve (120) for the inner valve (110). The inner relief valve (120) may be coaxial with the common axis (20), and with the inner valve (110). There may be seals that seal the inner relief valve (120) against the inner valve (110).

In some embodiments, the nipple further comprises a locking groove (300) on an outer side of the housing (10), the locking groove may be circumferential around the housing (10) and having a shape substantially as a combination of two intersecting and stepped U-shaped grooves, as explained above. The stepped U-shaped grooves of the locking groove (300) may be arranged and configured such that a ball, of a ball lock of a coupling, has two separate positions in the locking groove (300), e.g. such that the coupling with the ball lock must be pressed towards the nipple and subsequently push a locking sleeve of the coupling away from the nipple to unlock a coupling from the nipple. The ball fits in each U-shape, allowing the ball to take two different positions, and this shape of the U-shaped groove allows the safety function and ensures that the venting is safely made during connection and disconnection.

In some embodiments, the nipple may be configured such that the first sleeve (230) seals against the first seal (232) in a position where the outer relief valve (220) is open, this position is illustrated in FIG. 2. A further axial movement of the first sleeve (230) away from the first seal (232) moves the second sleeve (240). As may be taken, for example, from FIG. 1, the first sleeve (230) may have a shape, a perpendicular extension at the end, which catches the second sleeve (240). In some embodiments, the first sleeve (230) and the second sleeve (240) may be complimentary shaped for the first sleeve (230) to connect to the second sleeve (240) when the first sleeve (230) is axially moved in to the nipple. Such a connection may be made by the perpendicular extension at the end as, for example, illustrated by FIG. 1. In the second embodiment, the end of the first sleeve (230) is shaped to move the second sleeve (240), as may be taken from FIGS. 5 to 7.

In some embodiments, the nipple may further comprise a spring (12) exerting a force to close the outer relief valve (220). The spring (12) may be a helical spring, as illustrated in FIGS. 1-12. The spring (12) and any internal pressure inside the nipple and any equipment connected to the nipple are closing the outer relief valve (220) and the outer valve (210). The second sleeve (240) and/or the first sleeve (230) are forced out, towards the coupling, by any internal pressure and/or the spring (12). The spring (12) may exert spring force directly or indirectly onto the first sleeve (230) and/or to the second sleeve (240).

The first sleeve (230) may be pushed in by the coupling, for example when connecting the nipple and coupling, by hand force and this will in turn open the outer relief valve (220) to vent any residual internal pressure in the nipple. Thereby a complete connection between the nipple and coupling can be made by hand force even if there is a considerable residual internal pressure of several hundred bars inside the nipple. Mere hand force, such as for example no more than 45 Newton, or less than 30 newton, or less than 15 Newton, is enough according to the disclosed embodiments to connect the nipple with a coupling, because the only force to overcome is the spring force. Any internal frictions between moving parts can be neglected.

Figure 5:
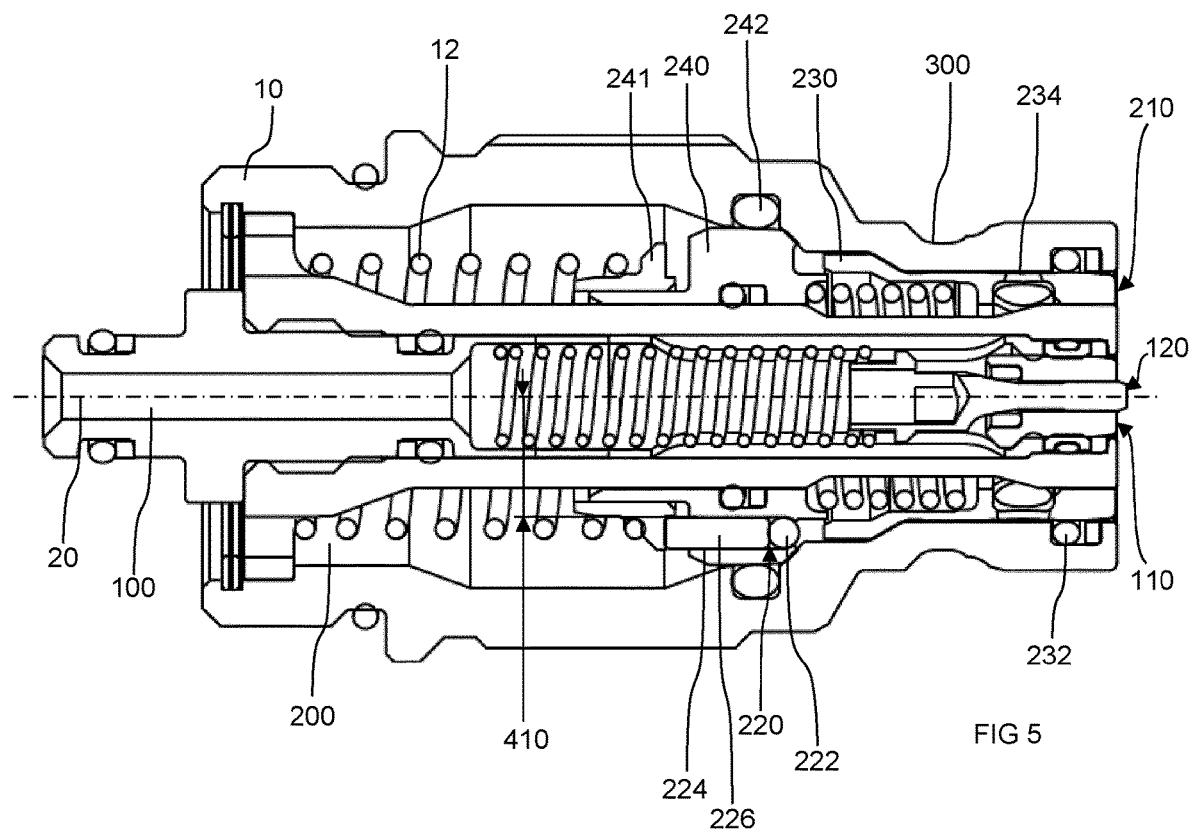
FIG. 5 is a diagrammatic illustration of an example nipple and an example coupling in a disconnected position incorporating teachings of the present disclosure.
Figure 9:
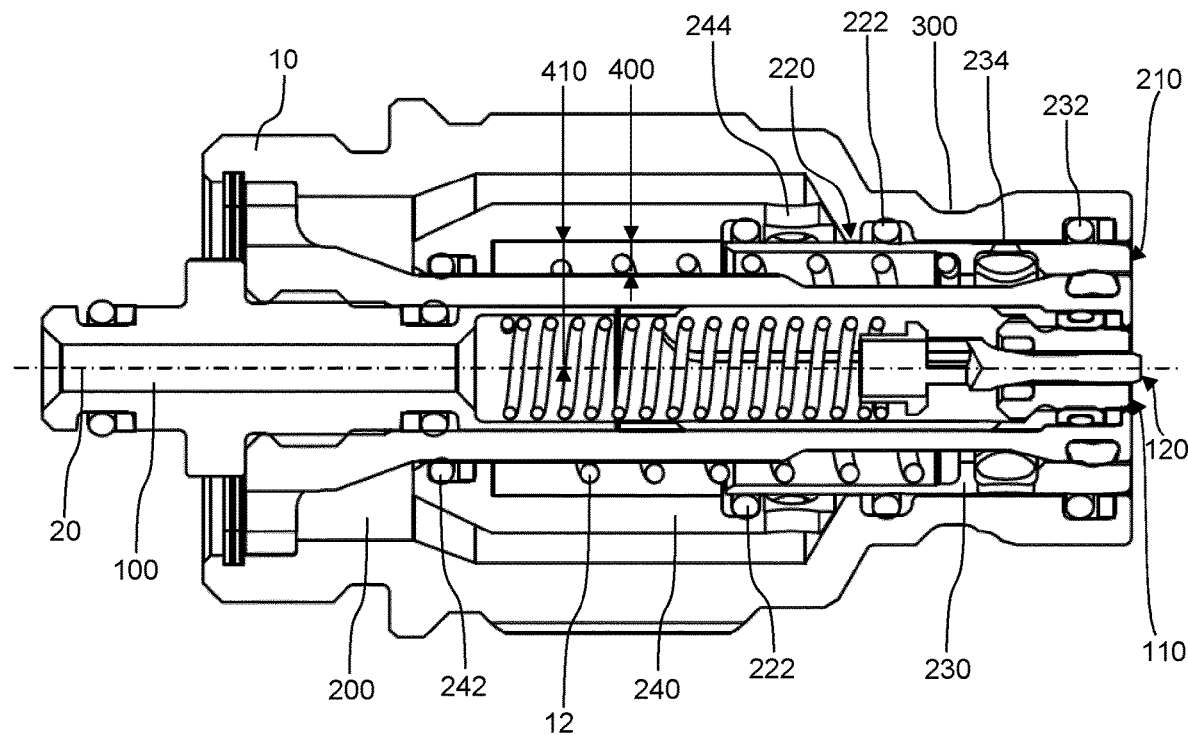
FIG. 9 is a diagrammatic illustration of an example nipple and an example coupling in a disconnected position incorporating teachings of the present disclosure.

In some embodiments, the first sleeve (230) may have one or more first sleeve openings (234) and/or the second sleeve (240) may have one or more second sleeve openings (244), see for example FIGS. 5 and 9. These openings may allow fluid to pass through them. The openings may face perpendicular to the common axis (20), and may be through holes.

In some embodiments, the first seal (232) may be held by the housing (10), and the third seal (222) may be held by the first sleeve (230). The first seal (232) may be positioned at, arranged in, the housing (10), at the end towards the valves. The third seal (222) may be positioned at, arranged in, the first sleeve (230), at the end away from the valves.

As another example, some embodiments of the teachings herein include a method to balance out an internal pressure acting on a relief valve of a nipple. With reference to FIGS. 1 to 13, the example method to balance out an internal pressure acting on a relief valve of a nipple, comprises arranging two seals (232, 222) on substantially the same radial distance from a central axis of the nipple, each of the two seals (232, 222) sealing the same movable sleeve (230) for closing or opening the relief valve (220). As explained above with reference to the example embodiments, the two seals, the first seal (232), and the third seal (222), or the first seal (232) and the two third seals (222), are arranged, substantially, on the same radial distance (410) from a common axis (20) of the inner fluid passage (100) and the outer fluid passage (200). By arranging them on the same, substantial, radial distance (410), there is no difference, area, in the radial direction on which any internal residual pressure can act, and that has to be overcome when venting such internal residual pressure. This has also been explain above. Since the first seal (232) and the third seal (222) have the same radial distance from the central axis of the co-axial nipple there is no area, for example an annulus shaped area, on which any residual pressure can force the first sleeve (230) outwards, towards the coupling. This arrangement of the first seal (232) and the third seal (222) balances the first sleeve (230), and results in that there is no force to overcome to push the first sleeve (230) inwards into the nipple. If there is a spring (12) then only the spring force has to be overcome, and the small amount of friction between moving parts and seals can be disregarded.

In some embodiments, the two seals may have the following functions. The first seal (232), of the two, seals between the movable sleeve (230) and a housing (10) of the nipple. The third seal (222), the other seal of the two seals, seals between any internal pressure and the movable sleeve (230). The third seal (222), the other seal of the two seals, may seal between any internal pressure and a pressure of an external environment, 100 kPa, for example atmospheric pressure at sea level. The third seal (222) may seal between the movable sleeve (230) and a housing (10) of the nipple.

In some embodiments, the method may further comprise to provide a gap (238) between the first sleeve (230) and the second sleeve (240). The gap (238) may provide a possibility for the fluid to more easily pass between the sleeves as illustrated in FIG. 2. The gap (238) may be realised by providing one or more protrusions (239), for example as illustrated in FIG. 16. The gap (238) may be complimented with, or replaced with, one or more pockets (247) and/or one or more passages (246) between the first sleeve (230) and the second sleeve (240). The provision of the gap (238) and/or one or more pockets (247) and/or one or more passages (246) ensures that the two sleeves do not seal against each other at the ends, and this allows any residual pressure to more easily escape. This means that a variation of the residual pressure in the nipple does not change the force required to open the outer relief valve (220). A residual pressure of up to 300 kPa, 30 bar, can be made without any gap or passages, but for a residual pressure over 300 kPa, 30 bar, the nipple may include a gap (238) and/or one or more pockets (247) and/or one or more passages (246). Regardless if the residual fluid pressure is low, for example less than 300 kPa, 30 bar, or if the residual fluid pressure is high, for example 1200 kPa, 120 bar, substantially the same low force is required to open the outer relief valve (220). The force required to open the outer relief valve (220) may be substantially equal to the force to overcome the spring force of the spring (12). To this may naturally come minor additional forces from internal friction between moving parts and against seals, but they can largely be neglected as they can easily be overcome by hand force. The required force to open the outer relief valve (220) is no more than hand force, less than 45 Newton, or even a force less than 30 Newton.

In some embodiments, the nipple is a nipple according to any one of the embodiments disclosed herein. The method to balance out an internal pressure acting on a relief valve may be according to any one of the embodiments disclosed herein.

Figure 13:
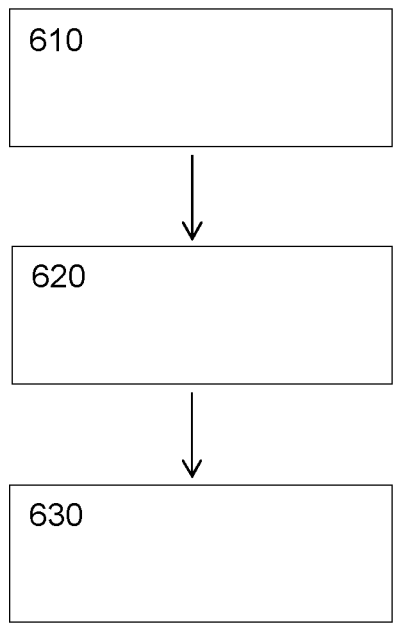
FIG. 13 is a flow diagram of an example method for balancing a relief valve incorporating teachings of the present disclosure.

In some embodiments, the method to balance out an internal pressure acting on a relief valve of a nipple, may further comprise a way to safely vent the nipple while disconnecting or connecting. The method may further, or independently, comprise a safety unlocking method between the nipple, according to embodiments with the locking groove (300) disclosed herein, and a coupling (500). The coupling (500) may comprise a locking sleeve (510) and locking balls (520) for establishing a locked connection between the nipple and the coupling (500). With reference to FIG. 13, the method comprises only unlocking the coupling (500) and the nipple when first (610) pushing the coupling (500) and the nipple towards each other, and secondly (620) pushing the locking sleeve (510) of the coupling (500) away from the nipple. The previous method step (630) of ensuring that the two seals (232, 222) are arranged on substantially the same radial distance from the central axis (20) of the nipple may be taken before or after the steps (610) or (620), or does not have to be combined with the steps (610) or (620). This ensures safe venting.

In some embodiments, the locking sleeve (510) can rotate freely. This results in that someone holding the connected nipple and coupling while working would not accidentally disconnect the nipple and coupling.

In some embodiments, the first sleeve (230) seals against the first seal (232) in a position where the outer relief valve (220) is initially opened, and a further axial movement of the first sleeve (230) moves the second sleeve (240), together with the first sleeve (230), and the first sleeve (230) no longer seals against the first seal (232). According the first and third embodiments, the second sleeve (240) may be axially movable for sealing against the second seal (242) of the housing (10).

All embodiments give examples on and illustrates how an outer relief valve (220) for a co-axial nipple is balanced so that the relief valve can be opened by mere hand force regardless of any residual pressure in the nipple. This is especially so when there is no fluid connections between the inner fluid passage (100) and the outer fluid passage (200). If there is a fluid connection between the fluid passages, then only one outer relief valve (220) could handle pressure relief for both fluid passages.

In some embodiments, nipple may adapted for high pressure fluids. High pressure fluids may be 70 MPa, 100 MPa or more, or 150 MPa or more, or 200 MPa or more, or 300 MPa or more, or 400 MPa or more. The nipple may be for a fluid, such as air, gas, liquid, hydraulic fluids, etc. The nipple may be for a high pressure quick fit coupling. The adaptation may be made by selecting appropriate metal, dimensions, and machining. The nipple may in one embodiment be made of steel and treated chemically and/or heated to become harder.

In some embodiments, any residual pressurised fluid may be prevented to escape out to the environment, via the path (250), out between the nipple and coupling. The prevention may be done by arranging axially the seals and the valves in such a way that when the valves of the nipple and the coupling opens then the nipple and the coupling seal and prevent fluid to escape to the environment outside the nipple and coupling. Such an arrangement may for example be not using a flat-face nipple and/or coupling. A further example, the fluid pressure in the tubes that would be connected to the coupling may have a lower pressure than the residual pressure in the nipple. For such a prevention, the above described relief function and principle operate in the same way, and any residual fluid may then be lead back to a tank of a pump, or similar equipment that can receive fluid.

In some embodiments, a hydraulic tool comprises the nipple according to any embodiment disclosed herein with two fluid passages (100, 200). The nipple, of the hydraulic tool, is connectable to a coupling with a co-axial hose. In some embodiments, the hydraulic tool is a torque wrench. This allows a torque wrench to receive pressurised fluid via a co-axial hose, rather than via a twin hose. The embodiments described above of the nipple, and correspondingly a coupling with corresponding relief valves, may be used with twin hoses, two separate hoses next to each other, or may be used with co-axial hoses, one hose within another hose. This would allow hydraulic tools to be able to use the same nipple and coupling, but to interchangeable use twin hoses or co-axial hoses. Many hydraulic tools use twin hoses, but embodiments of the present disclosure would allow co-axial hoses to be used. This would prevent twisting of the hoses, which occurs with twin hoses. This in turn leads to a faster and more ergonomic use of such a hydraulic tool. The nipple may be part of a hydraulic tool, such as a torque wrench. This would allow a coupling with a co-axial hose to be connected to such a hydraulic tool.

It will be apparent to those skilled in the art that various modifications and variations can be made to the nipples and the methods disclosed herein. Other embodiments will be apparent to those skilled in the art from consideration of the specification and practice of the disclosed nipple. It is intended that the specification and examples be considered as exemplary only, with a true scope being indicated by the following claims and their equivalents.

LIST OF ELEMENTS 10 housing
12 spring
20 common axis
100 inner fluid passage
110 inner valve
200 inner fluid passage
210 outer valve
220 outer relief valve
222 third seal
226 pin
230 first sleeve
232 first seal
234 first sleeve opening
238 gap
239 protrusion
240 second sleeve
241 third sleeve
242 second seal
244 second sleeve opening
246 sleeve passage
247 pocket
250 vent path
300 locking groove
400 radial distance between the first and second seals
410 radial distance
500 coupling
510 locking sleeve
520 locking balls
610 first method step
620 second method step
630 last, or initial, method step

What is claimed is:

1. A nipple comprising:
a fluid passage;
a housing;
a valve for the fluid passage;
a relief valve for the valve, the relief valve comprising:
a first sleeve axially movable for sealing against a first seal of the housing;
a second sleeve for sealing against a second seal of the housing; and
a third seal for sealing between the first sleeve and the second sleeve;
wherein relative axial movement between the first sleeve and the second sleeve opens or closes, respectively by the direction of the axial movement, the relief valve;
wherein the relief valve, the first seal, and the third seal are arranged at a set radial distance from a central axis of the fluid passage.

2. The nipple according to claim 1, further comprising a gap between the first sleeve and the second sleeve for allowing fluid to pass there between.

3. The nipple according to claim 1, wherein the first sleeve and/or the second sleeve comprises one or more pockets for the fluid, and/or one or more passages for the fluid.

4. The nipple according to claim 1, wherein the second sleeve is axially movable for sealing against the second seal of the housing.

5. The nipple according to claim 1, further comprising a locking groove on an outer side of the housing, the locking groove being circumferential around the housing and having a shape of a combination of two intersecting and stepped U-shaped grooves.

6. The nipple according to claim 5, wherein the stepped U-shaped grooves of the locking groove are arranged and configured such that a ball, of a ball lock of a coupling, has two separate positions in the locking groove, such that the coupling with the ball lock must be pressed towards the nipple and subsequently push a locking sleeve of the coupling away from the nipple to unlock the coupling from the nipple.

7. The nipple according to claim 1, wherein the first sleeve seals against the first seal in a position where the outer relief valve is open, and an axial movement of the first sleeve away from the first seal moves the second sleeve.

8. The nipple according to claim 1, wherein the first sleeve and the second sleeve are complimentary shaped for the first sleeve to connect to the second sleeve when the first sleeve is axially moved in to the nipple.

9. The nipple according to claim 1, further comprising:
a spring exerting a force to close the outer relief valve;
wherein the first sleeve has one or more first sleeve openings and/or the second sleeve has one or more second sleeve openings; and
wherein the first seal is held by the housing, and the third seal is held by the first sleeve.

10. A nipple comprising:
an inner fluid passage;
an outer fluid passage coaxial with the inner fluid passage;
a housing;
an inner valve for the inner fluid passage;
an outer valve for the outer fluid passage;
an outer relief valve for the outer valve, the outer relief valve comprising:
a first sleeve axially movable for sealing against a first seal of the housing;
a second sleeve for sealing against a second seal of the housing; and
a third seal for sealing between the first sleeve and the second sleeve;

wherein relative axial movement between the first sleeve and the second sleeve opens or closes, respectively by the direction of the axial movement, the outer relief valve; and the first seal and the third seal are arranged on a same radial distance from a common axis of the inner fluid passage and the outer fluid passage.

11. The nipple according to claim 10, further comprising an inner relief valve for the inner valve.

12. A method to manufacture a nipple providing relief of an internal pressure acting on a relief valve of the nipple, the method including:
arranging two seals at a first radial distance from a central axis of the nipple;
wherein each of the two seals seals a movable sleeve for closing or opening the relief valve;
providing a safety lock between the nipple and a coupling comprising a locking sleeve and locking balls for establishing a locked connection between the nipple and the coupling;
wherein unlocking the safety lock includes unlocking the coupling and the nipple only when first pushing the coupling and the nipple towards each other, and secondly pushing the locking sleeve of the coupling away from the nipple.

13. The method according to claim 12, wherein:
one seal of the two seals between the movable sleeve and a housing of the nipple; and
the other seal seals between any internal pressure and a pressure of the external environment.

14. The method of claim 12, wherein the locking sleeve can rotate freely.

15. A system comprising:
a hydraulic tool; and
a nipple to couple the hydraulic tool to a co-axial hose;
the nipple comprising:
a fluid passage;
a housing;
a valve for the fluid passage;
a relief valve for the valve, the relief valve comprising:
a first sleeve axially movable for sealing against a first seal of the housing;
a second sleeve for sealing against a second seal of the housing; and
a third seal for sealing between the first sleeve and the second sleeve;
wherein relative axial movement between the first sleeve and the second sleeve opens or closes, respectively by the direction of the axial movement, the relief valve;
wherein the relief valve, the first seal, and the third seal are arranged at a set radial distance from a central axis of the fluid passage.

16. The system according to claim 15, wherein the hydraulic tool comprises a torque wrench.

* * * * *